(12) United States Patent
Miki et al.

(10) Patent No.: US 9,664,959 B2
(45) Date of Patent: May 30, 2017

(54) DISPLAY DEVICE

(71) Applicant: Japan Display Inc., Minato-ku (JP)

(72) Inventors: Hirohisa Miki, Tokyo (JP); Shigesumi Araki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 84 days.

(21) Appl. No.: 14/644,565

(22) Filed: Mar. 11, 2015

(65) Prior Publication Data

US 2015/0261046 A1    Sep. 17, 2015

(30) Foreign Application Priority Data

Mar. 12, 2014 (JP) .................................. 2014-048418

(51) Int. Cl.
*G02F 1/1335* (2006.01)
*G02F 1/1343* (2006.01)
*G02F 1/1333* (2006.01)

(52) U.S. Cl.
CPC .. *G02F 1/134309* (2013.01); *G02F 1/133514* (2013.01); *G02F 2001/133331* (2013.01); *G02F 2001/133388* (2013.01); *G02F 2001/134345* (2013.01)

(58) Field of Classification Search
CPC ... G02F 2001/133388; G02F 1/133514; G02F 2001/133331
See application file for complete search history.

(56) References Cited

U.S. PATENT DOCUMENTS

| | | | |
|---|---|---|---|
| 6,307,606 B1 * | 10/2001 | Takii ................. | G02F 1/133514 349/106 |
| 6,348,958 B1 * | 2/2002 | Matsuoka ......... | G02F 1/133514 349/106 |
| 6,927,908 B2 | 8/2005 | Stark | |

FOREIGN PATENT DOCUMENTS

| | | |
|---|---|---|
| JP | 5-188873 | 7/1993 |
| JP | 2004-524551 | 8/2004 |

* cited by examiner

*Primary Examiner* — Kendrick Hsu
(74) *Attorney, Agent, or Firm* — Oblon, McClelland, Maier & Neustadt, L.L.P.

(57) ABSTRACT

In the case of a pixel including four and more sub pixels, the area of one pixel is larger than that in the case of a pixel including three sub pixels; therefore, high definition becomes difficult. When a central display area has a structure of four and more sub pixels, in a display device, the pixel structure in a peripheral display area for use in creating a virtual image is reduced to three sub pixels, to allocate the vacant space for high density assignment. Only the pixel density in the vicinity of a frame of a lens portion is compressed, in order to apparently resolve the discord with the image of a non-lens portion. The pixel side in the peripheral display area may be even or gradually narrowed.

19 Claims, 9 Drawing Sheets

DISPLAY DEVICE

CLAIM OF PRIORITY

The present application claims priority from Japanese patent application JP2014-048418 filed on Mar. 12, 2014, the content of which is hereby incorporated by reference into this application.

BACKGROUND

This disclosure relates to a display device and can be applied to a display device having a non-display area such as a frame area in a panel peripheral portion.

These days, liquid crystal displays are actively developed toward higher definition and frame narrowing. New products like wearable display are announced frequently. A frame, however, visibly existing in the outer periphery around a video, restricts a view from the point of design of a device. If a frameless device can be realized, a display area can be blended in with the background scenery and the application thereof as hardware is expected into widespread use.

In a challenge to thin the frame and reduce the area, there is a physical limit due to the restriction of wiring and sealing material of a liquid crystal panel. As one of the solving means, there is proposed a technique of hiding the frame with a virtual image. As a means of realizing this, as disclosed in Japanese Unexampled Patent Application Publication No. 2004-524551 (Patent Document 1), a display area (peripheral display area) for enlargement to supply a video for hiding the frame is provided separately from the normal display area (central display area), to enlarge only the video of the corresponding position with lens in a way of visible as if there were the video on the frame. Further, the display area for enlargement is deteriorated in image quality compared to the normal display area; therefore, in the Japanese Unexampled Patent Application Publication No. 2004-524551, pixel density in the display area for enlargement is increased to correct the deterioration.

SUMMARY

In a display device, one pixel is sometimes composed of sub pixels more than three colors (for example, red (R), green (G), and blue (B)) in order to reduce power consumption and expand color gamut. In short, color element structure of four and more is used. When a pixel is composed of four and more sub pixels, the area of one pixel is increased than in the case of a pixel including three sub pixels, which makes high definition difficult. The pixel structure in the display area is proceeding toward higher definition and the size of a sub pixel is decreased to the unit of micron. In this display device, there is a limit to the higher definition achieved in the peripheral display area than in the central display area. This limit affects the limit of enlarging the pixel with lens and the size of a frame that can be hidden with the virtual image is reduced.

Other problems and new features will be apparent from the description of this disclosure and the attached drawings.

Of the disclosure, the typical outline will be briefly described as follows.

A display device includes a display panel and a translucent cover. The display panel includes a first display area, a frame area, and a second display area arranged between the first display area and the frame area. The translucent cover includes a first area arranged above the first display area and a second area arranged above the second display area and the frame area. The pixel in the first display area is composed of four and more sub pixels. The pixel in the second display area is composed of three sub pixels. The pixel density in the second display area is larger than the pixel density in the first display area.

DESCRIPTION OF THE PREFERRED EMBODIMENTS

Figure 1A:
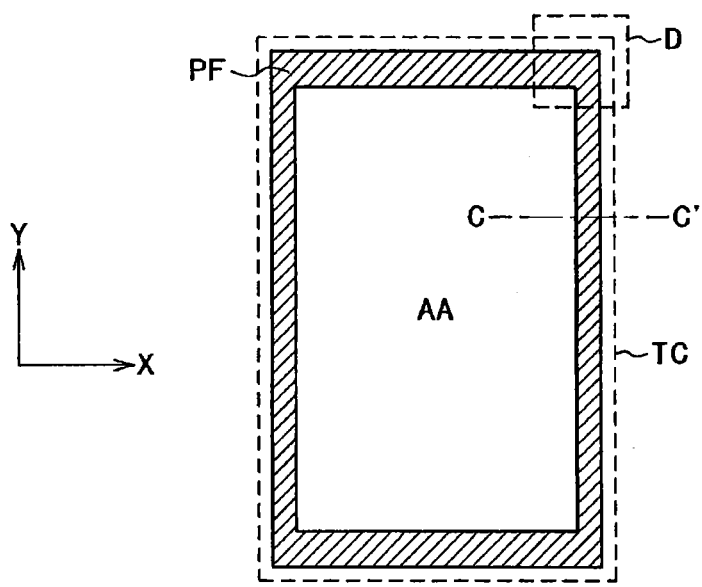
FIG. 1A is a top plan view illustrating the structure of a display device according to a first embodiment.

In a display device according to the embodiments, when a central display area is formed by the pixel structure of four and more sub pixels, the pixel structure in a peripheral display area used for creating a virtual image is reduced to three sub pixels, to allocate the vacant space for high density assignment. Only the pixel density in the vicinity of a frame portion (peripheral display area) of a lens portion is compressed, in order to apparently resolve the discord with the image of a non-lens portion (flat portion). Each pixel side in the peripheral display area may be even or gradually narrowed.

According to the above-mentioned display device, although a frame area exists in a display panel, a translucent cover including a lens portion is provided in the display panel on the side of an observer, to enlarge the pixels or image in the vicinity of the frame with the lens and show the image as if the image were actually on the frame, which can put the frame area out of sight. By relaxing the limit of high definition, the size of a frame that can be hidden with the virtual image can be enlarged.

The display device according to the embodiments can be applied to various kinds of flat panel display devices such as organic EL display device, liquid crystal display device, other spontaneous display device, and electronic paper type display device including electrophoretic element. Further, it is needless to say that the above display device can be applied to the devices of various sizes from small, medium to a large size.

Hereinafter, embodiments and modified examples will be described with reference to the drawings. The disclosure is only one example and proper change that could be arrived at by those skilled in the art while keeping the spirit of the invention is naturally to be included in the scope of the invention. The drawings are illustrated schematically with the width, thickness, and shape of each unit different from the actual ones, to make the description clearer; however, the drawings are only one example and not to restrict the interpretation of the invention. In the specification and the drawings, the same reference numerals are attached to the same elements that have been described in the previous drawings and the detailed description is properly omitted.

First Embodiment

A display device according to a first embodiment will be described with reference to FIGS. 1A to 1F.

Figure 1B:
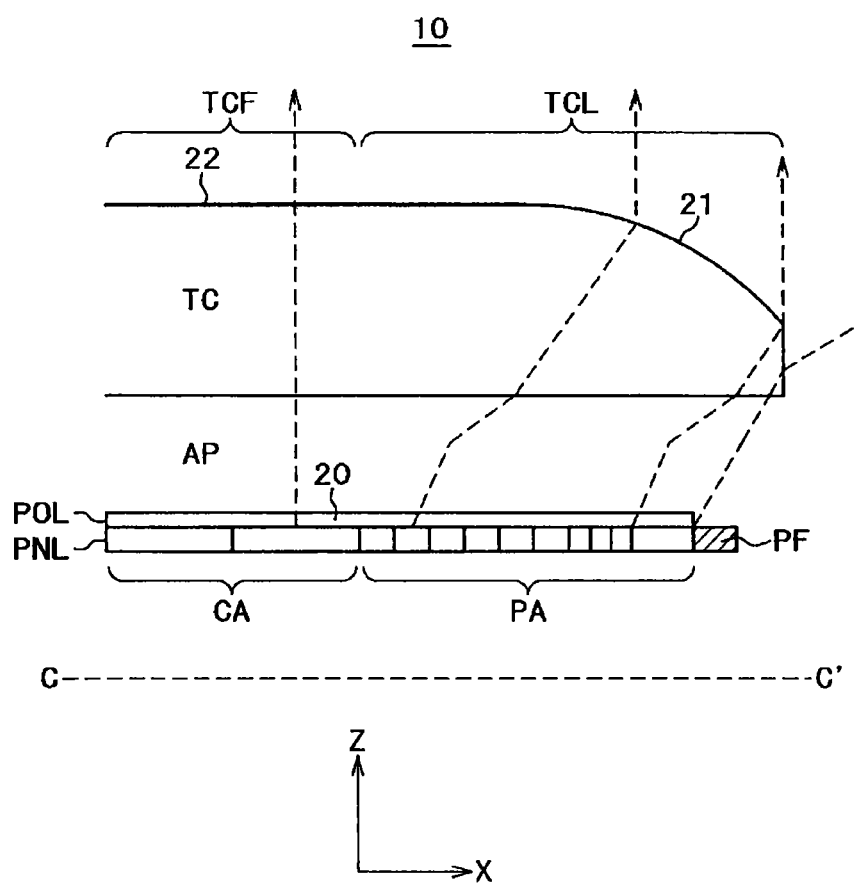
FIG. 1B is a cross-sectional view taken along the line C-C' of FIG. 1A.
Figure 1C:
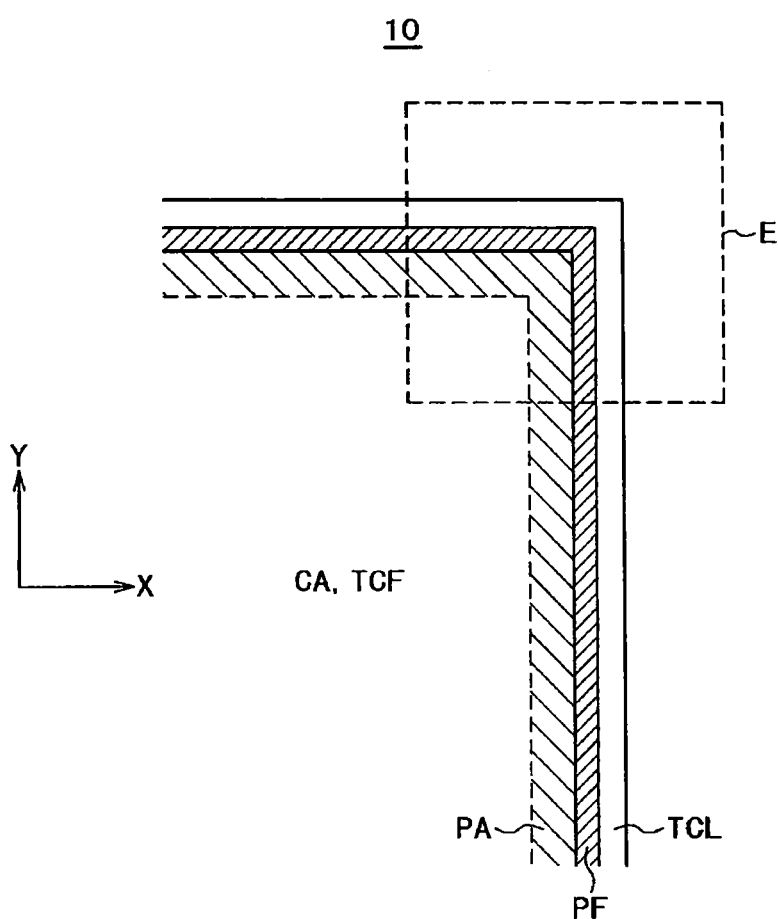
FIG. 1C is an enlarged top plan view of a rectangular area D of FIG. 1A.
Figure 1D:
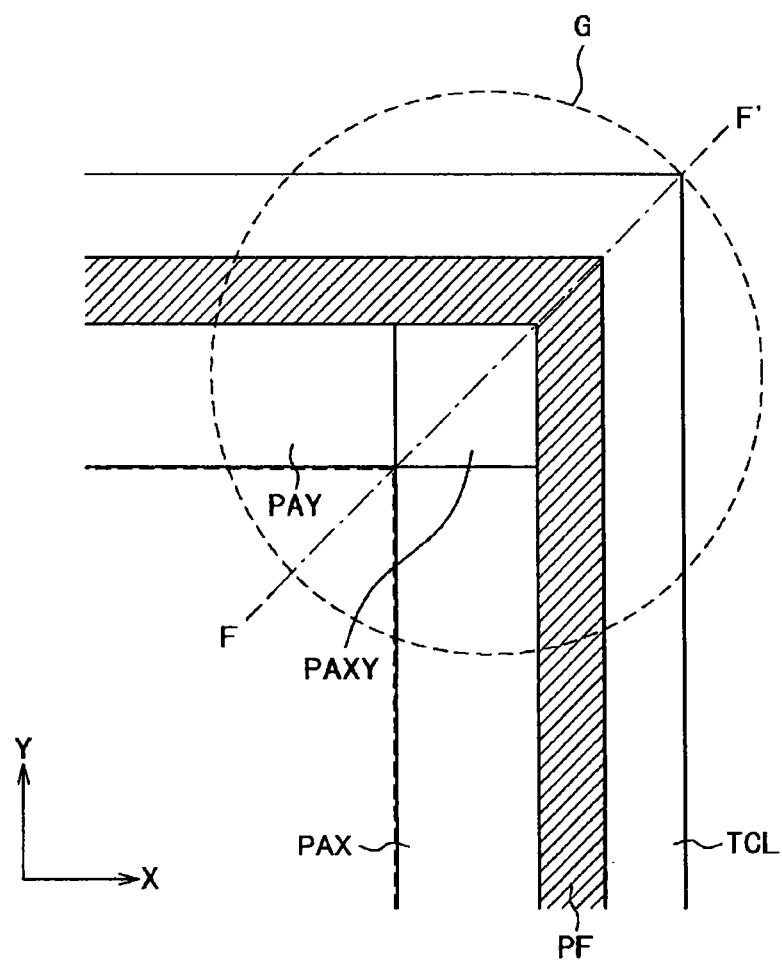
FIG. 1D is an enlarged top plan view of a rectangular area E of FIG. 1C.
Figure 1E:
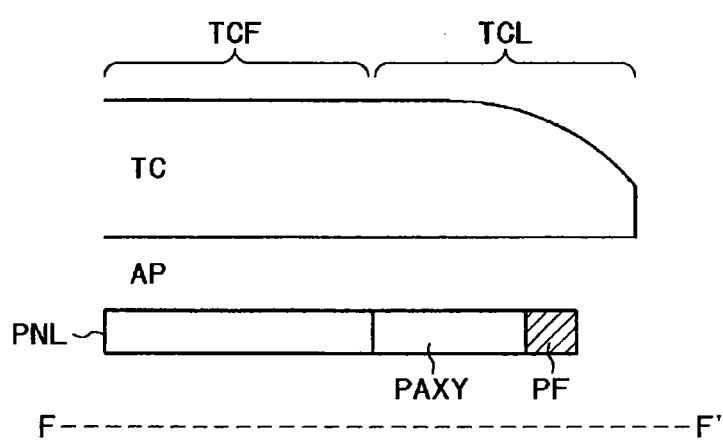
FIG. 1E is a cross-sectional view taken along the line F-F' of FIG. 1D.

FIG. 1A is a top plan view illustrating the structure of the display device according to the first embodiment. FIG. 1B is a cross-sectional view taken along the line C-C' of FIG. 1A. FIG. 1C is an enlarged top plan view of a rectangular area D of FIG. 1A. FIG. 1D is an enlarged top plan view of a rectangular area E of FIG. 1C. FIG. 1E is a cross-sectional view taken along the line F-F' of FIG. 1D.

A display device 10 according to the first embodiment includes a display panel PNL and a translucent cover TC. For example, the display panel PNL includes a T array substrate (TFT substrate) where a pixel electrode and a thin film transistor (TFT) are formed and an opposite substrate (CF substrate) where a color filter is formed. When the display panel PNL is a liquid crystal display panel, a liquid crystal layer is interposed between the array substrate and the opposite substrate. A driving circuit formed by a semiconductor integrated circuit is COG-mounted in the lower frame area of the array substrate in FIG. 1A. In the array substrate, a video signal line (source line) and a scanning line (gate line) are formed. The scanning line (gate line) extends in the X direction (first direction) within a display area AA. The video signal line (source line) extends in the Y direction (second direction) within the display area AA from the driving circuit formed by the semiconductor integrated circuit. A driving circuit of the scanning line may be formed by a driving circuit composed of the semiconductor integrated circuit or may be formed by the TFT circuit in the right and/or left frame area in FIG. 1A.

As illustrated in FIG. 1A, the display panel PNL is rectangular and has a frame area PF provided in the display area AA and outside the display area AA. The display area AA includes a plurality of pixels in an array shape. Each pixel consists of R sub pixel, G sub pixel, B sub pixel, and W sub pixel. Each sub pixel has a rectangle shape (vertical stripe) with the length in the vertical direction (Y direction) longer than the length in the horizontal direction (X direction).

As illustrated in FIG. 1B, the display area AA includes a central display area (first area) CA and a peripheral display area (second area) PA. The central display area CA includes a plurality of pixels and the pixel density is even in these pixels. The peripheral display area PA includes a plurality of pixels and the pixel density of these pixels is increased in accordance with the magnification ratio and good visible performance. A polarizing plate POL and an air phase AP are provided between the translucent cover TC and the display panel PNL. The air phase AP may be formed of a resin layer with a refractive index medium between air and the translucent cover TC (for example, about 1 to 1.5 times). The translucent cover TC is quite larger than the display panel PNL. The translucent cover TC includes a flat plate portion (non-lens portion, first area) TCF and a lens portion (second area) TCL. The translucent cover TC is rectangular on a plan view and the lens portion TCL is provided in four sides of the translucent cover TC. As illustrated in FIG. 1D, each lens portion at the four corners of the translucent cover TC has a cut-off shape of a circular lens indicated by a dotted line. The lens portion TCL of the translucent cover TC is arranged at a position overlapping with the area including the frame area PF of the display panel PNL and the peripheral display area PA of the display area AA adjacent to the frame area PF. A surface 20 of the lens portion TCL on the observer side is curved. An output surface 22 of the flat plate portion TCF is in parallel to the display surface 20 of the display panel PNL.

As illustrated in FIG. 1B, a light emitted from the peripheral display area PA enters the lens portion TCL and is refracted outside (toward the side of the frame area PF). The light entering the lens portion TCL is refracted on the surface 20 of the lens portion TCL on the observer side and emitted from the same surface 20 arranged above the peripheral display area PA and the frame area PF. The light emitted from the surface 20 of the lens portion TCL on the observer side proceeds straight in a direction (Z direction) vertical to the display surface 20. According to this, an image formed in the peripheral display area PA of the display panel PNL is displayed in an enlarged way in the area including the peripheral display area PA and the frame area PF, which makes the frame area PF invisible. Further, a light emitted from a pixel arranged in the central display area CA enters the flat plate portion TCF and proceeds in a direction (Z direction) vertical to the display surface 20. According to this, the image formed in the central display area CA is displayed in the flat plate portion TCF on the observer side.

As the lens portion TCL, a convex lens, a concave lens, a convex cylindrical lens, or a concave cylindrical lens is used. The lens portion TCL may be formed by a liquid crystal lens. As illustrated in FIG. 1D, the lens portion TCL in each of the four corners has a cut-off shape of the circular lens. However, the lens portion is not necessarily circular but may be formed by two cylindrical lenses.

As illustrated in FIG. 1D, the peripheral display area PA includes an area PAX of achieving high definition in the X direction, an area PAY of achieving high definition in the Y direction, and an area PAXY of achieving high definition in the X and Y directions. As illustrated in FIGS. 1D and 1E, at the four corners of the rectangular translucent cover TC, the display area is as big as the display panel PNL.

Figure 2:
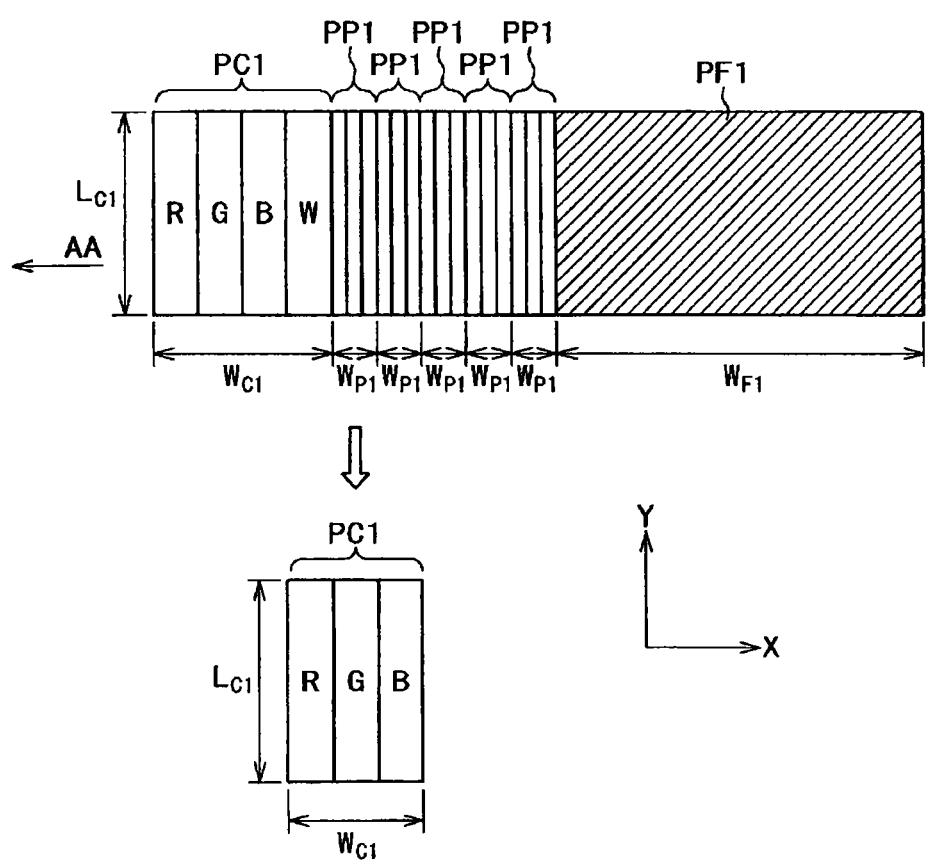
FIG. 2 is a top plan view illustrating the structure of a display panel according to the first embodiment.
Figure 3:
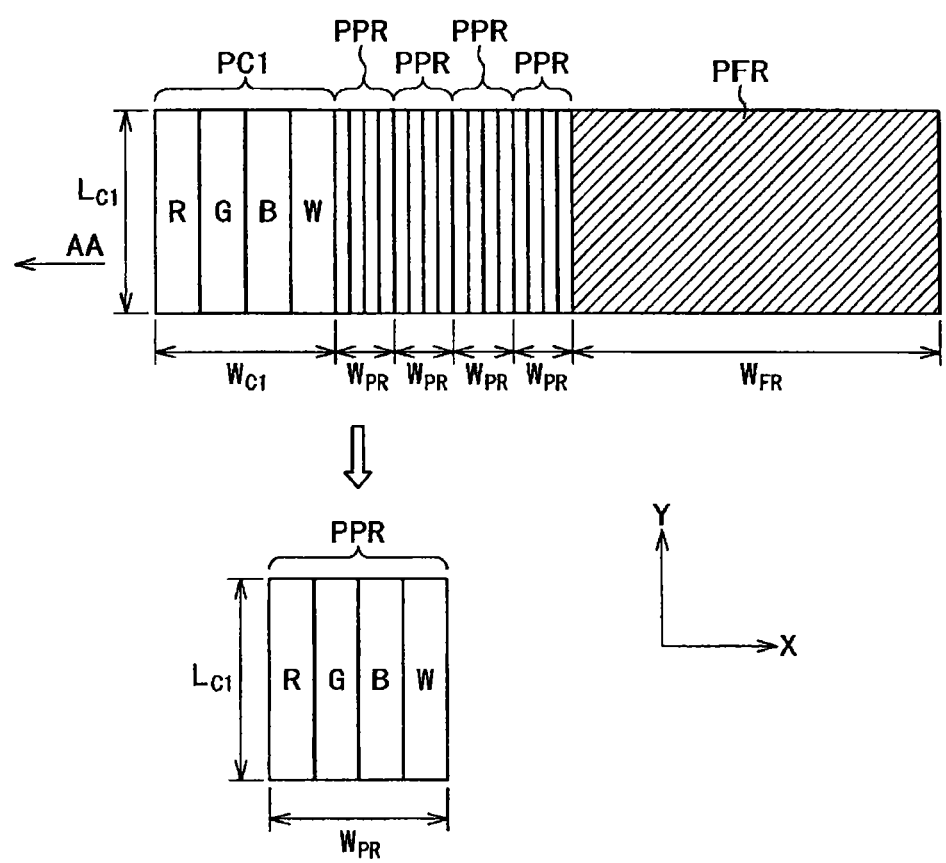
FIG. 3 is a top plan view illustrating the structure of a display panel according to a comparison example.

FIG. 2 is a top plan view illustrating the structure of the display panel according to the first embodiment. FIG. 3 illustrates a portion corresponding to the line C-C' of FIG. 1A.

In the display panel according to the first embodiment, the central display area CA includes a plurality of pixels (first pixel) PC1, and the peripheral display area PA includes five pixels (second pixels) PP1 in the X direction, hence to hide the frame area PF1 with the virtual image.

The pixel PC1 in the central display area CA is composed of vertical stripe shaped R sub pixel, G sub pixel, B sub pixel, and W sub pixel. When the width of the pixel PC1 is defined as $W_{C1}$ and the length thereof is defined as $L_{C1}$, the width of each sub pixel is $W_{C1}/4$ and the length thereof is defined as $L_{C1}$. The pixel PP1 in the peripheral display area PA is composed of vertical stripe shaped R sub pixel, G sub pixel, and B sub pixel. When the width of the pixel PP1 is defined as $W_{P1}$, the width of each sub pixel is $W_{P1}/3$. Here, $W_{P1} < W_{C1}$. The length of the pixel PP1 and each sub pixel is $L_{C1}$. The pixel density of the pixels PP1 is larger than the pixel density of the pixels PC1. In other words, the peripheral display area PA of the display panel according to the first embodiment has a high definition in the X direction. The length and the width of each pixel side of the five pixels PP1 are designed even and manufactured to be even.

Comparison Example

FIG. 3 is a top plan view illustrating the structure of a display panel according to a comparison example. FIG. 3 illustrates a portion corresponding to the line C-C' of FIG. 1A.

In the display panel according to the comparison example, the central display area CA includes a plurality of pixels PC1, and the peripheral display area PA includes four pixels PPR in the X direction, hence to hide the frame area PFR with a virtual image.

The pixel PC1 of the central display area CA is the same as that of the first embodiment. The pixel PPR in the peripheral display area PA is composed of vertical stripe shaped R sub pixel, G sub pixel, B sub pixel, and W sub pixel. When the width of the pixel PPR is defined as $W_{PR}$, the width of each sub pixel is $W_{PR}/4$. Here, $W_{PR}<W_{C1}$. The length of the pixel PPR and each sub pixel is $L_{C1}$. In short, the peripheral display area PA of the display panel according to the comparison example has a high definition in the X direction. The length and the width of each pixel side are even in the four pixels PPR. The width of the peripheral display area PA is $4 \times W_{PR}$ and the width of the frame area PFR is $W_{FR}$.

When the width of each sub pixel of the pixel PP1 in the first embodiment is equal to the width of each sub pixel of the pixel PPR in the comparison example, $$W_{P1}/3 = W_{PR}/4$$

$$\therefore W_{P1} = 3 \times W_{PR}/4 < W_{PR} < W_{C1}.$$

The width of the peripheral display area PA in the first embodiment is $$5 \times W_{P1} = 5 \times 3 \times W_{PR}/4 = 15 \times W_{PR}/4 < 4 \times W_{PR},$$

and narrower than the width of the peripheral display area PA in the comparison example by $W_{PR}/4$. In other words, even when the width of the peripheral display area PA in the first embodiment is equal to the width of the peripheral display area PA in the comparison example, the number of the pixels in the peripheral display area PA in the first embodiment can be more than the number of the pixels in the peripheral display area PA in the comparison example by one pixel. Accordingly, the width ($W_{F1}$) of the frame area PF1 hidden by a virtual image in the first embodiment can be more than the width ($W_{FR}$) of the frame area PFR hidden by the virtual image in the comparison example.

Second Embodiment

Figure 4:
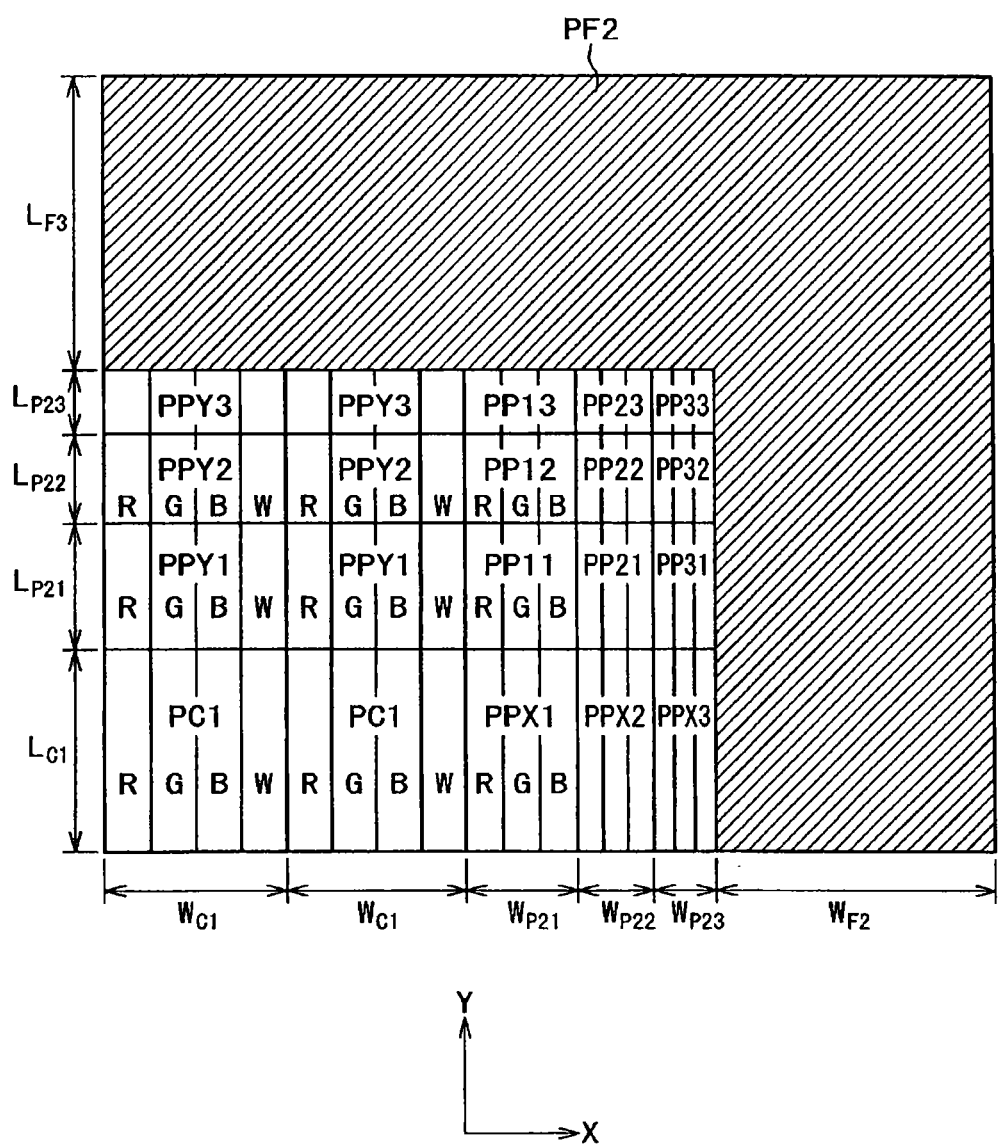
FIG. 4 is a top plan view illustrating the structure of a display panel according to a second embodiment.

FIG. 4 is a top plan view illustrating the structure of a display panel according to a second embodiment. FIG. 4 illustrates a portion corresponding to a rectangle D of dotted line of FIG. 1A.

A display device according to the second embodiment is different from the display device according to the first embodiment only in the pixel structure of the display panel and the peripheral display area PA, and the other structure is the same. In the display panel according to the second embodiment, the central display area CA includes a plurality of pixels PC1 and the peripheral display area PA includes three pixels in the X direction and three pixels in the Y direction, hence to hide the frame area PF2 with a virtual image. Accordingly, the panel includes three pixels in the X direction in the peripheral display area PAX, three pixels in the Y direction in the peripheral display area PAY, and nine pixels in the peripheral display area PPXY.

The pixel PC1 in the central display area CA is the same as that of the first embodiment. Each of the pixels PPX1, PPX2, and PPX3 in the peripheral display area PAX is composed of vertical stripe shaped R sub pixel, G sub pixel, and B sub pixel. When the width of the pixel (second pixel) PPX1 is defined as $W_{P21}$ and the length thereof is defined as $L_{C1}$, the width of each sub pixel is $W_{P21}/3$ and the length thereof is $L_{C1}$. When the width of the pixel (third pixel) PPX2 is defined as $W_{P22}$ and the length thereof is defined as $L_{C1}$, the width of each sub pixel is $W_{P22}/3$ and the length thereof is $L_{C1}$. When the width of the pixel PPX3 is defined as $W_{P23}$ and the length thereof is defined as $L_{C1}$, the width of each sub pixel is $W_{P23}/3$ and the length thereof is $L_{C1}$. Here, $W_{P23}<W_{P22}<W_{P21}<W_{C1}$. The pixel density increases in the order of the pixel PC1, the pixel PPX1, the pixel PPX2, and the pixel PPX3. In other words, the peripheral display area PAX is getting narrower in the pixel width and higher definition according as it is closer to the frame area PF2 in the X direction.

The pixel PPY1, PPY2, and PPY3 in the peripheral display area PAY is composed of vertical stripe shaped R sub pixel, G sub pixel, B sub pixel, and W sub pixel. When the width of the pixel (second pixel) PPY1 is defined as $W_{C1}$ and the length thereof is defined as $L_{P21}$, the width of each sub pixel is $W_{C1}/4$ and the length thereof is $L_{P21}$. When the width of the pixel (third pixel) PPY2 is defined as $W_{C1}$ and the length thereof is defined as $L_{P22}$, the width of each sub pixel is $W_{C1}/4$ and the length thereof is $L_{P22}$. When the width of the pixel PPY3 is defined as $W_{C1}$ and the length thereof is defined as $L_{P23}$, the width of each sub pixel is $W_{C1}/4$ and the length thereof is $L_{P23}$. Here, $L_{P23}<L_{P22}<L_{P21}<L_{C1}$. The pixel density increases in the order of the pixel PC1, the pixel PPY1, the pixel PPY2, and the pixel PPY3. In other words, the peripheral display area PPY is getting shorter in the pixel length and higher definition according as it is closer to the frame area PF2 in the Y direction.

Each of the pixels PP11, PP21, and PP31 in the peripheral display area PPXY is composed of vertical stripe shaped R sub pixel, G sub pixel, and B sub pixel. When the width of the pixel (second pixel) PP11 is defined as $W_{P21}$ and the length thereof is defined as $L_{P21}$, the width of each sub pixel is $W_{P21}/3$ and the length thereof is $L_{P21}$. When the width of the pixel PP21 is defined as $W_{P22}$ and the length is defined as $L_{P21}$, the width of each sub pixel is $W_{P22}/3$ and the length thereof is $L_{P21}$. When the width of the pixel PP31 is defined as $W_{P23}$ and the length thereof is defined as $L_{P21}$, the width of each sub pixel is $W_{P23}/3$ and the length thereof is $L_{P21}$. Each of the pixels PP12, PP22, and PP32 is composed of vertical stripe shape R sub pixel, G sub pixel, and B sub pixel. When the width of the pixel PP12 is defined as $W_{P21}$ and the length thereof is defined as $L_{P22}$, the width of each sub pixel is $W_{P21}/3$ and the length thereof is $L_{P22}$. When the width of the pixel (third pixel) PP22 is defined as $W_{P22}$ and the length thereof is defined as $L_{P22}$, the width of each sub pixel is $W_{P22}/3$ and the length thereof is $L_{P22}$. When the width of the pixel PP32 is defined as $W_{P23}$ and the length thereof is defined as $L_{P22}$, the width of each sub pixel is $W_{P23}/3$ and the length thereof is $L_{P22}$. Each of the pixels PP13, PP23, and PP33 is composed of vertical stripe shape R sub pixel, G sub pixel, and B sub pixel. When the width of the pixel PP13 is defined as $W_{P21}$ and the length thereof is defined as $L_{P23}$, the width of each sub pixel is $W_{P21}/3$ and the length thereof is $L_{P23}$. When the width of the pixel PP23 is defined as $W_{P22}$ and the length thereof is defined as $L_{P23}$, the width of each sub pixel is $W_{P22}/3$ and the length thereof is $L_{P23}$. When the width of the pixel PP33 is defined as $W_{P23}$ and the length thereof is defined as $L_{P23}$, the width of each sub pixel is $W_{P23}/3$ and the length thereof is $L_{P23}$. Here, $W_{P23}<W_{P22}<W_{P21}<W_{C1}$ and $L_{P23}<L_{P22}<L_{P21}<L_{C1}$. For example, the pixel density increases in the order of the pixel PPC1, the pixel PP11, the pixel PP22, and the pixel PP33. In other words, the peripheral display area PPXY is getting smaller in the size of the pixel and higher definition according as it closer to the frame area PF2 in the X and Y directions.

Third Embodiment

Figure 5:
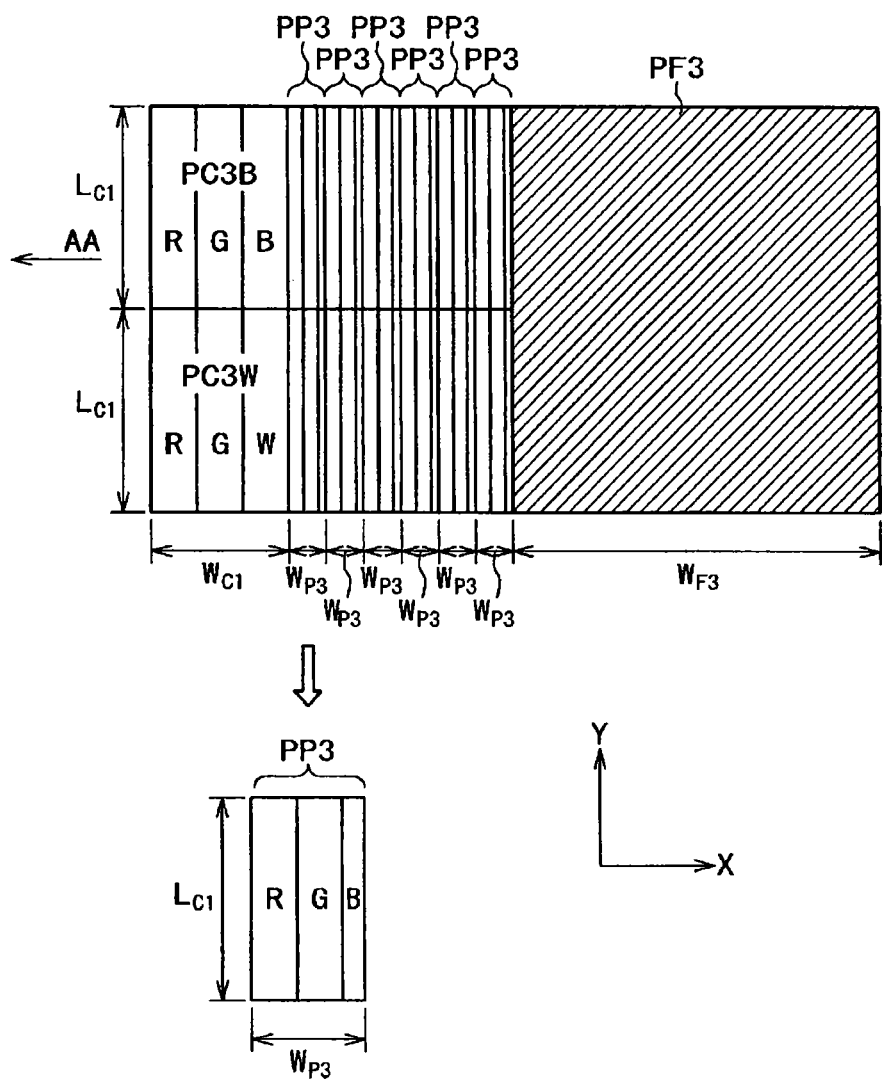
FIG. 5 is a top plan view illustrating the structure of a display panel according to a third embodiment.

FIG. 5 is a top plan view illustrating the structure of a display panel according to a third embodiment. FIG. 5 illustrates a portion corresponding to the line C-C' of FIG. 1A.

In the display panel according to the third embodiment, the central display area CA includes a plurality of pixels PC3B and pixels PC3W in a checkered pattern and the peripheral display area PA includes six pixels PP3 in the X direction, hence to hide the frame area PF3 with a virtual image.

The pixel (first pixel) PC3B in the central display area CA is composed of vertical stripe shaped R sub pixel, G sub pixel, and B sub pixel, and the pixel (fourth pixel) PC1W is composed of vertical stripe shape R sub pixel, G sub pixel, and W sub pixel. When each size of the pixels PC3B and PC3W is equal to the size of the pixel PC1 of the first embodiment, the width is $W_{C1}$ and the length is $L_{C1}$.

The pixel (second pixel) PP3 in the peripheral display area PA is composed of vertical stripe shape R sub pixel, G sub pixel, and B sub pixel. When the width of the pixel PP3 is defined as $W_{P3}$ and the length thereof is defined as $L_{C1}$, each width of the R sub pixel and the G sub pixel is $2\times W_{P3}/5$, the width of the B sub pixel is $W_{P3}/5$, and the length of each sub pixel is $L_{C1}$. Here, when each width of the R sub pixel and the G sub pixel is equal to the width of each sub pixel of the first embodiment, $2\times W_{P3}/5=W_{P1}/3$. Therefore, $W_{P3}=5\times W_{P1}/6$. Here, $W_{P3}=5\times W_{P1}/6=5\times W_{PR}/8<W_{P1}<W_{PR}<W_{C1}$. In other words, the peripheral display area PA according to the third embodiment is getting higher definition in the X direction. The length and the width of each pixel side are even in the six pixels PP3. The width of the peripheral display area PA in the third embodiment is $$6\times W_{P3}=6\times 5\times W_{P1}/6=5\times W_{P1},$$

equally to the width of the peripheral display area PA in the first embodiment. Therefore, the number of the pixels in the peripheral display area PA according to the third embodiment can be larger than the number of the pixels in the peripheral display area PA according to the first embodiment by one pixel. As the result, the width ($W_{F3}$) of the frame area PF3 that can be hidden with the virtual image according to the third embodiment can be larger than the width ($W_{F1}$) of the frame area PF1 that can be hidden with the virtual image according to the first embodiment.

Fourth Embodiment

Figure 6:
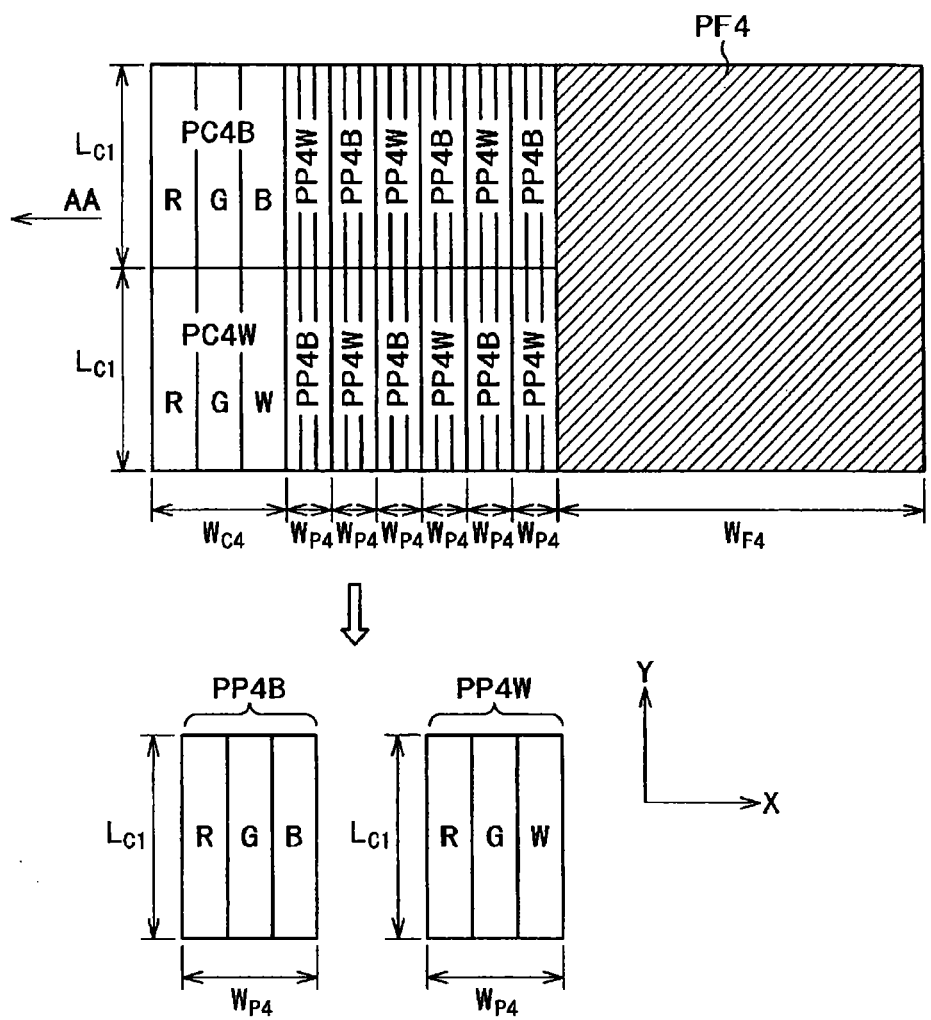
FIG. 6 is a top plan view illustrating the structure of a display panel according to a fourth embodiment.

FIG. 6 is a top plan view illustrating the structure of a display panel according to a fourth embodiment. FIG. 6 illustrates a portion corresponding to the line C-C' of FIG. 1A.

In the display panel according to the fourth embodiment, the central display area CA includes a plurality of pixels PC4B and pixels PC4W in a checkered pattern and the peripheral display area PA includes three pixels PP4B and three pixels PP4W in a checkered pattern in the X direction, hence to hide the frame area PF4 with a virtual image.

The pixel (first pixel) PC4B in the central display area CA is composed of vertical stripe shaped R sub pixel, G sub pixel, ad B sub pixel, and the pixel (fourth pixel) PC4W is composed of vertical stripe shaped R sub pixel, G sub pixel, and W sub pixel. When each width of the pixel PC4B and PC4W is defined as $W_{C4}$ and each length thereof is defined as $L_{C1}$, the width of each sub pixel is $W_{C4}/3$ and the length thereof is $L_{C1}$. When the width of each sub pixel according to the fourth embodiment is defined as the same width of the sub pixel in the comparison example, $W_{C4}/3=W_{C1}/4$. Since $W_{C4}=3\times W_{C1}/4$, the pixel density of the central display area CA according to the fourth embodiment can be higher than that of the central display area CA according to the comparison example.

The pixel (fourth pixel) PP4B in the peripheral display area PA is composed of vertical stripe shape R sub pixel, G sub pixel, and B sub pixel. The pixel (fifth pixel) PP4W is composed of vertical stripe shape R sub pixel, G sub pixel, and W sub pixel. When each width of the pixels PP4B and PP4W is defined as $W_{P4}$ and each length thereof is defined as $L_{C1}$, the width of each sub pixel is $W_{P4}/3$ and the length thereof is $L_{C1}$. When the width of each sub pixel according to the fourth embodiment is equal to the width of each sub pixel according to the comparison example, $W_{P4}/3=W_{PR}/4$. Since $W_{P4}=3\times W_{PR}/4$, the pixel density in the peripheral display area PA according to the fourth embodiment can be higher than the pixel density in the peripheral display area PA according to the comparison example.

The pixel density in the central display area CA according to the fourth embodiment is equal to the pixel density composed of the sub pixels of the conventional three colors and the pixel density in the peripheral display area PA according to the fourth embodiment is equal to the pixel density composed of the sub pixels of the conventional three colors. Therefore, the display device according to the fourth embodiment can secure the pixel density to the same degree as that of the conventional display device while keeping the display characteristic with higher luminance than the conventional display device.

Although the vertical stripe shaped display device has been described in the first to the fourth embodiments, it is needless to say that the invention can be applied to a horizontal stripe shaped display device. The horizontal stripe shape means a rectangle with the length in the horizontal direction (X direction) of each sub pixel longer than the length in the vertical direction (Y direction).

What is claimed is:
1. A display device comprising
a display panel, and
a translucent cover,
wherein the display panel includes
a first display area,
a frame area, and
a second display area arranged between the first display area and the frame area;
the translucent cover includes
a first area arranged above the first display area, and
a second area arranged above the second display area and the frame area; and
the first display area is composed of four and more kinds of sub pixels,
the second display area is composed of three kinds of sub pixels, and
pixel density of pixel in the second display area is larger than the pixel density in the first display area.

2. The device according to claim 1,
wherein the first display area includes a first pixel,
the first pixel is composed of four and more kinds of sub pixels,
the second display area includes a second pixel,
the second pixel is composed of three kinds of sub pixels, and
the pixel density of the second pixel is larger than the pixel density of the first pixel.

3. The device according to claim 2, wherein the second pixel is enlarged in the second area.

4. The device according to claim 2,
Wherein the first area includes a plurality of the first pixels, and
the second area includes a plurality of the second pixels.

5. The device according to claim 2,
wherein the first pixel is composed of red sub pixel, green sub pixel, blue sub pixel, and white sub pixel, and
the second pixel is composed of red sub pixel, green sub pixel, and blue sub pixel.

6. The device according to claim 2,
wherein the first area includes a plurality of the first pixels,
the second area further includes a third pixel, and
the pixel density of the third pixel is larger than the pixel density of the second pixel.

7. The display device according to claim 6,
wherein the first pixel is composed of red sub pixel, green sub pixel, blue sub pixel, and white sub pixel, and
each of the second and the third pixels is composed of red sub pixel, green sub pixel, and blue sub pixel.

8. The device according to claim 1,
wherein the first display area includes a first pixel and a fourth pixel,
the first pixel is composed of red sub pixel, green sub pixel, and blue sub pixel,
the fourth pixel is composed of red sub pixel, green sub pixel, and white sub pixel,
the second display area includes a second pixel,
the second pixel is composed of red sub pixel, green sub pixel, and blue sub pixel, and
the pixel density of the second pixel is larger than each pixel density of the first pixel and the fourth pixel.

9. The device according to claim 8,
wherein the second display area further includes a fifth pixel,
the fifth pixel is composed of red sub pixel, green sub pixel, and white sub pixel, and
the pixel density of the fifth pixel is larger than each pixel density of the first pixel and the fourth pixel.

10. The device according to claim 1,
wherein the display panel includes
a scanning line extending in a first direction, and
a video signal line extending in a second direction different from the first direction, and
the sub pixel is formed in a rectangle shape with a side in the second direction longer than the other side in the first direction.

11. The device according to claim 1,
wherein the display panel includes
an array substrate,
an opposite substrate, and
a liquid crystal layer interposed between the array substrate and the opposite substrate.

12. The device according to claim 1, wherein the second area of the translucent cover is a lens portion.

13. The device according to claim 1, comprising
an air phase between the display panel and the translucent cover.

14. The device according to claim 1, wherein the translucent cover is arranged closer to a side of an observer than the display panel.

15. A display device comprising
a display panel, and
a translucent cover,
wherein the display panel includes
a first display area,
a frame area, and
a second display area arranged between the first display area and the frame area;
the translucent cover includes
a non-lens portion arranged above the first display area, and
a lens portion arranged above the second display area and the frame area;
the first display area includes a first pixel composed of four kinds of sub pixels;
the second display area includes a second pixel composed of three kinds of sub pixels;
the pixel density of the second pixel is larger than the pixel density of the first pixel, and
the second pixel is enlarged with the lens portion.

16. The device according to claim 15,
wherein the first pixel is composed of red sub pixel, green sub pixel, blue sub pixel, and white sub pixel, and
each of the second pixels is composed of red sub pixel, green sub pixel, and blue sub pixel.

17. The device according to claim 15,
wherein the display panel includes
a scanning line extending in a first direction, and
a video signal line extending in a second direction different from the first direction, and
the sub pixel is formed in a rectangle shape with a side in the second direction longer than the other side in the first direction.

18. The device according to claim 15,
wherein the display panel includes
an array substrate,
an opposite substrate, and
a liquid crystal layer interposed between the array substrate and the opposite substrate.

19. The device according to claim 15, wherein the translucent cover is arranged closer to a side of an observer than the display panel.

* * * * *